United States Patent
Rahman

(10) Patent No.: US 12,501,462 B2
(45) Date of Patent: *Dec. 16, 2025

(54) SYSTEMS AND METHODS FOR OPTIMIZING CELLULAR SPECTRUM UTILIZATION

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,038

(22) Filed: Apr. 24, 2024

(65) Prior Publication Data

US 2024/0276531 A1 Aug. 15, 2024

Related U.S. Application Data

(63) Continuation of application No. 17/245,656, filed on Apr. 30, 2021, now Pat. No. 11,979,892.

(51) Int. Cl.
*H04W 72/52* (2023.01)
*H04W 92/20* (2009.01)

(52) U.S. Cl.
CPC ............ *H04W 72/52* (2023.01); *H04W 92/20* (2013.01)

(58) Field of Classification Search
None
See application file for complete search history.

(56) References Cited

U.S. PATENT DOCUMENTS

| 8,938,240 | B2 | 1/2015 | Farhadi |
| 10,257,729 | B2 | 4/2019 | Carbajal |
| 2008/0198829 | A1 | 8/2008 | Cheng |
| 2008/0222019 | A1 | 9/2008 | Stanforth |
| 2009/0073934 | A1 | 3/2009 | Tzavidas |
| 2009/0163221 | A1 | 6/2009 | Abedi |
| 2009/0303941 | A1 | 12/2009 | Naka |
| 2010/0105332 | A1* | 4/2010 | McHenry .............. H04W 16/14 455/62 |
| 2010/0173586 | A1 | 7/2010 | Mchenry |
| 2011/0038431 | A1 | 2/2011 | Frederiksen et al. |
| 2011/0092209 | A1 | 4/2011 | Gaal |

(Continued)

*Primary Examiner* — Wutchung Chu
*Assistant Examiner* — Berhanu D Belete
(74) *Attorney, Agent, or Firm* — Lee & Hayes, P.C.

(57) ABSTRACT

A computer-implemented method for managing radio spectrum in a cellular network including periodically analyzing a local spectrum utilization data to determine spectrum use levels at the local base station. The method may include periodically receiving, at the local base station, neighbor spectrum utilization data from at least one neighbor base station in the cellular network. The neighbor spectrum utilization data is associated with spectrum use levels at the at least one neighbor base station. The method may include receiving a spectrum assignment request from a mobile computing device and, in response, determining a spectrum assignment for the mobile computing device based on at least one of the neighbor spectrum utilization data and local spectrum utilization data. The method may include transmitting the spectrum assignment to the mobile computing device.

20 Claims, 4 Drawing Sheets

(56) References Cited

U.S. PATENT DOCUMENTS

| | | | |
|---|---|---|---|
| 2012/0044834 A1 | 2/2012 | Cheng | |
| 2012/0184310 A1* | 7/2012 | Abedi | H04W 16/14 455/501 |
| 2013/0072192 A1* | 3/2013 | Xu | H04B 7/15542 455/11.1 |
| 2013/0097309 A1* | 4/2013 | Ma | H04L 67/02 709/224 |
| 2013/0188524 A1* | 7/2013 | Cheng | H04L 41/12 370/255 |
| 2013/0208664 A1* | 8/2013 | Viswanathan | H04L 5/0028 370/329 |
| 2013/0297819 A1* | 11/2013 | Mittal | H04L 47/781 709/232 |
| 2014/0113612 A1* | 4/2014 | Shu | H04W 64/006 455/418 |
| 2014/0128073 A1* | 5/2014 | Farhadi | H04W 16/14 455/436 |
| 2014/0128088 A1 | 5/2014 | Farhadi | |
| 2014/0171136 A1* | 6/2014 | Elrefaey | H04W 28/16 455/509 |
| 2014/0198734 A1* | 7/2014 | Yamada | H04W 8/14 370/329 |
| 2015/0052239 A1* | 2/2015 | Lamarca | H04L 41/5029 709/224 |
| 2015/0106481 A1* | 4/2015 | Ma | H04L 65/60 709/219 |
| 2015/0237609 A1* | 8/2015 | Sun | H04W 36/302 370/329 |
| 2015/0373554 A1* | 12/2015 | Freda | H04W 16/14 455/450 |
| 2016/0095016 A1 | 3/2016 | El-Refaey | |
| 2016/0197787 A1* | 7/2016 | Cheng | H04W 84/18 370/255 |
| 2016/0248989 A1* | 8/2016 | Cross | H04N 21/2385 |
| 2016/0286425 A1 | 9/2016 | Gormley et al. | |
| 2017/0041802 A1* | 2/2017 | Sun | H04W 16/10 |
| 2017/0289840 A1* | 10/2017 | Sung | H04W 24/02 |
| 2017/0295578 A1 | 10/2017 | Khoshnevisan | |
| 2018/0139637 A1* | 5/2018 | Dong | H04W 24/08 |
| 2018/0159742 A1* | 6/2018 | Cheng | H04W 72/044 |
| 2018/0213421 A1* | 7/2018 | Horvitz | H04W 16/14 |
| 2018/0324813 A1* | 11/2018 | Mueck | H04W 72/541 |
| 2018/0324814 A1* | 11/2018 | Mueck | H04W 72/541 |
| 2019/0132744 A1* | 5/2019 | Buchmayer | H04W 24/02 |
| 2019/0132853 A1* | 5/2019 | Mitola, III | H04W 16/14 |
| 2019/0199765 A9* | 6/2019 | Ma | H04L 65/1045 |
| 2019/0261394 A1* | 8/2019 | Li | H04W 72/23 |
| 2019/0313259 A1* | 10/2019 | Bendlin | H04W 74/0816 |
| 2019/0335375 A1* | 10/2019 | Yeddala | H04W 36/302 |
| 2020/0112950 A1* | 4/2020 | Chen | H04W 36/0061 |
| 2020/0260291 A1* | 8/2020 | Markwart | H04W 16/14 |
| 2021/0092035 A1* | 3/2021 | Williams | H04L 47/22 |
| 2021/0212001 A1* | 7/2021 | Brisebois | H04L 43/0876 |
| 2021/0235385 A1* | 7/2021 | Takeda | H04W 52/42 |
| 2021/0329466 A1* | 10/2021 | Khasnabish | H04W 16/10 |
| 2021/0337391 A1* | 10/2021 | Sevindik | H04W 8/26 |
| 2022/0078823 A1* | 3/2022 | Li | H04W 72/0446 |
| 2022/0191874 A1* | 6/2022 | Bahrami | H04W 72/541 |
| 2022/0256474 A1 | 8/2022 | Myron | |
| 2023/0396319 A1* | 12/2023 | Lambert | H04B 7/18504 |

\* cited by examiner

SYSTEMS AND METHODS FOR OPTIMIZING CELLULAR SPECTRUM UTILIZATION

RELATED APPLICATIONS

This application is a continuation of and claims priority to U.S. patent application Ser. No. 17/245,656, filed Apr. 30, 2021, titled "SYSTEMS AND METHODS FOR OPTIMIZING CELLULAR SPECTRUM UTILIZATION," the entirety of which is incorporated herein by reference.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Cellular network communication relies on certain radio frequency ranges assigned for mobile devices to provide cellular services through transmission and reception of signals. Because frequencies are limited, each network provider may be allocated certain portions of the radio frequency spectrum to provide service to its particular customers. Network providers may then user various strategies to optimize the use of the frequency spectrum they are allocated in order to provide optimal cellular service.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for managing radio spectrum in a cellular network. The method may include periodically analyzing, by one or more processors at a local base station in the cellular network, local spectrum utilization data to determine spectrum use levels at the local base station. The method may include periodically receiving, at the local base station, neighbor spectrum utilization data from at least one neighbor base station in the cellular network, where the neighbor spectrum utilization data associated with spectrum use levels at the at least one neighbor base station. The method may include receiving, at the local base station, a spectrum assignment request from a mobile computing device and, in response to receiving the spectrum assignment request, determining a spectrum assignment for the mobile computing device based on at least one of the neighbor spectrum utilization data and local spectrum utilization data. The method may also include transmitting the spectrum assignment to the mobile computing device.

In another embodiment, the disclosure describes a computer-implemented method for managing radio spectrum in a cellular network. The method may include receiving, at a local base station, first neighbor spectrum utilization data from a neighbor base station in the cellular network. The first neighbor spectrum utilization data may be associated with spectrum use levels at the neighbor base station at a first point in time. The method may include receiving, at the local base station, a first spectrum assignment request from a first mobile computing device and, in response to receiving the first spectrum assignment request, determining, via one or more processors at the local base station, a first spectrum assignment for the first mobile computing device based on the first neighbor spectrum utilization data. The method may include transmitting the first spectrum assignment to the first mobile computing device. The method may include receiving, at the local base station, second neighbor spectrum utilization data from the neighbor base station, where the second neighbor spectrum utilization data may be associated with spectrum use levels at the neighbor base station at a second point in time different than the first point in time. The method may include receiving, at the local base station, a second spectrum assignment request. In response to receiving the second spectrum assignment request, the method may include determining, via the one or more processors at the local base station, a second spectrum assignment based on the second neighbor spectrum utilization data and transmitting the second spectrum assignment.

In another embodiment, the disclosure describes a system for managing radio spectrum in a cellular network. The system may include a first base station in the cellular network, the first base station having a first coverage area, and a second base station in the cellular network, the second base station having a second coverage area adjacent the first coverage area and configured to transmit second spectrum utilization data to the first base station. The second spectrum utilization data may be associated with spectrum use levels at the second base station. The first base station may include one or more processors in communication with a memory containing processor-executable instructions to periodically analyze, by the one or more processors, first spectrum utilization data to determine spectrum use levels at the first base station, receive a spectrum assignment request from a mobile computing device. In response to receiving the spectrum assignment request, the memory may also contain instructions to determine a spectrum assignment for the mobile computing device based on at least one of the first spectrum utilization data and the second spectrum utilization data, and to transmit the spectrum assignment to the mobile computing device.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
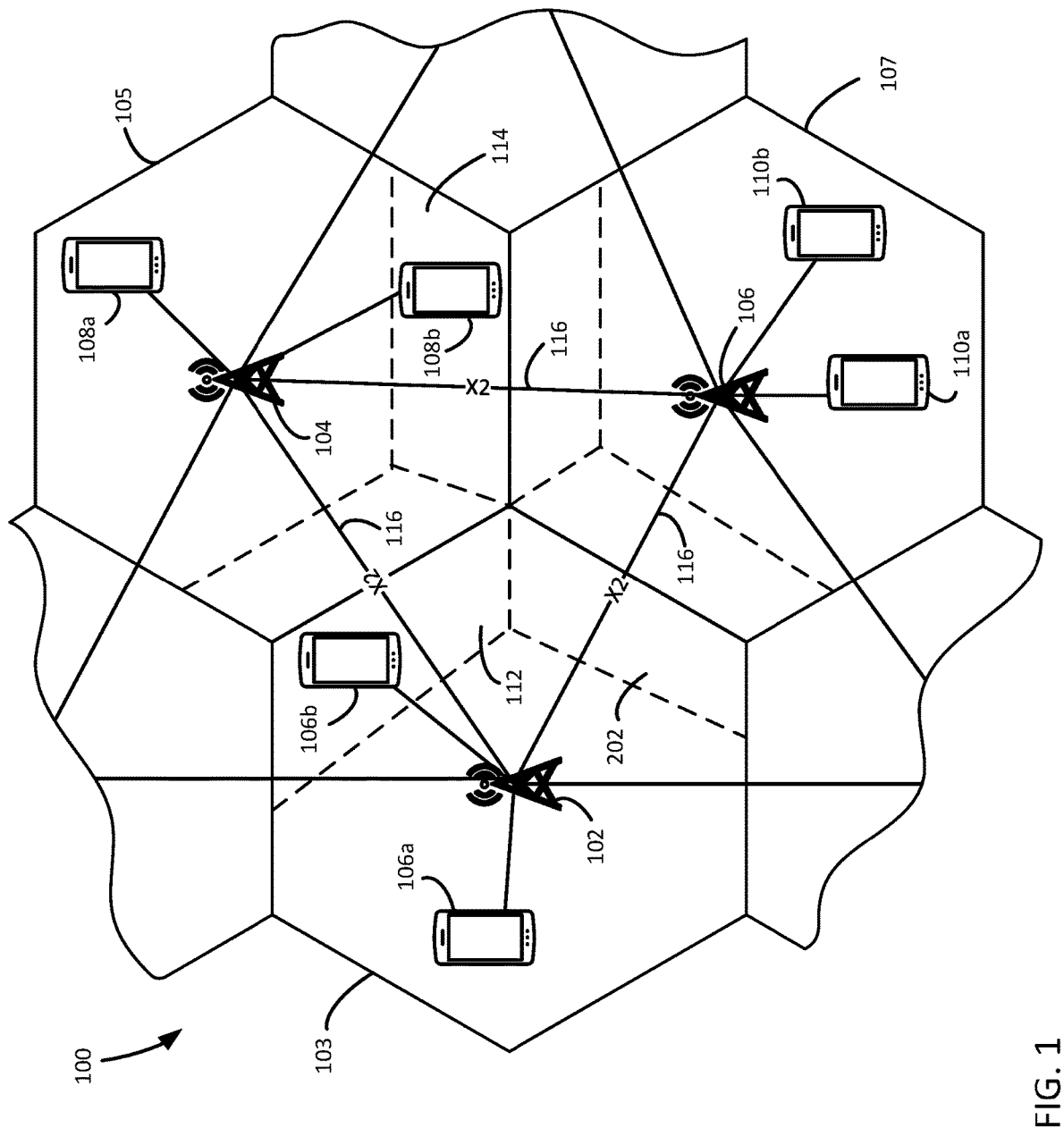
FIG. 1 is a high level data flow diagram for an embodiment of a portion of a base station cluster that may implement the method of optimizing cellular spectrum utilization in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Cellular network providers may have limited access to radio spectrum to provide services to their customers. For example, low-band fifth generation (5G) cellular services may occupy a range of frequencies between about 600 MHz and 850 MHz, all of which may then be divided up further for allocation to individual network operators their particular bandwidth or bandwidths. When a customer for a particular network operator uses their user equipment (UE) (e.g., mobile telephone, tablet, smartphone, etc.), the network may assign that UE with a particular portion of the allocated frequency to use for the particular requested service. The general term for allocating frequencies to UEs may be "layer management" or "steering logic." Traditionally, network operators may configure the network components, (e.g., base stations, such as eNodeB (4G) or gNodeB (5G)) to use static, pre-defined logic to determine and convey a preferred spectrum sequence to devices. In some embodiments, this logic may be based, in part, on which UE may camp on a specific band of radio spectrum from different ranges (e.g., n66, n71, n41, n4, mmWave bands, etc.), particularly when in an idle mode. In some embodiments, the static network logic may be injected into the network configuration periodically based on various factors (e.g., location, network usage, etc.), but the static steering logic or algorithm may be the same for each interaction with that base station unless or until new steering logic may be injected by the network operator.

The disclosure describes, in some embodiments, systems and methods for optimizing spectrum utilization in cellular networks that may help achieve more optimal frequency spectrum utilization and help improve customer experience by more effectively allocating frequency spectrum to UEs. In some embodiments, the disclosure may include using an alternative to the traditional static steering logic, and instead (or in addition) dynamically changing the layer management (i.e., spectrum sequence preference list) so as to leverage available radio spectrum in a more optimal manner. In other words, the steering logic used by base stations to perform layer management may include dynamic factors that may result in non-static logic for determining layer assignments. In some embodiments, this may include using real-time spectrum utilization dynamics as perceived by each base station. In some embodiments, the logic for determining layer management in the disclosure may include leveraging physical resource block (PRB) utilization. In some embodiments, for a spectrum layer that a particular first base station (e.g., gNodeB) may not be broadcasting, that first base station may rely on a neighboring second base station to receive feedback on spectrum utilization for that spectrum layer to inform the first base station of how that spectrum may be being used nearby. The usage of that spectrum (and other layers) may be used as a dynamic variable input to the network's steering logic so as to incorporate real-time, dynamic network information into layer management.

This communication and coordination between neighboring base stations in a network may allow a cluster of neighboring base stations to make more intelligent decisions regarding spectrum utilization and where to more efficiently assign UEs to unused layers. For example, even if a first base station may not be utilizing a particular frequency band (i.e., layer), if a second UE in connection with a second base station is using that particular frequency band, the first base station may avoid assigning that frequency band to a first UE in order to avoid potential conflicts if the two UEs were to move into the same cell. Those of skill in the art may also appreciate additional advantages to neighboring base stations coordinating to include dynamic data from one another in conducting layer management.

In some embodiments, using the disclosed methods, each base station partnered with one another may refine that base station's real-time understanding of how the available radio spectrum is being utilized in the network. In some embodiments, this additional understanding and information may then be used to make changes in the spectrum band preference list so that UEs may be assigned to the most optimal spectrum layer that may be the least congested or may stand the least chance at becoming congested in the near future. Thus, in some embodiments, the disclosed systems and methods provide a technical solution to the technical problem of efficiently and optimally allocating limited frequency spectrum to UEs. The result may be improved network reliability, more efficient use of frequency spectrum that may result in service of more customers, a more optimized cellular network, etc.

FIG. 1 shows an embodiment of a base station cluster 100 that may be configured according to the system and methods for optimizing network performance disclosed herein. In some embodiments, the base station cluster 100 may be only a portion of a larger cellular network, such as a third generation (3G) network, fourth generation (4G) long term evolution (LTE) network, 5G network, or a combination of these or other networks. The base station cluster 100 may include a plurality of base stations including a first base station 102, a second base station 104, and a third base station 106. Each base station may cover a "cell" coverage area and provide connection for UEs within that region. For example, the first base station is disposed within a first cell 103, the second base station 104 is disposed within a second cell 105, and the third base station 106 is disposed within a third cell 107. It should be understood that, in some embodiments, a base station cluster may include more or fewer than three base stations and associated cells and that varying numbers of other base stations may be in communication with one another. It should also be understood that, while the cells are depicted as hexagonal in shape and having defined boundaries, in practice the actual coverage area of any particular base station may not have substantially any shape and many adjacent cells may overlap such that a UE may communicate with more than one base station at once. The type of base station may vary depending on the type of network the cluster 100 in which the base stations are included. For example, in 4G networks the base stations may be evolved Node B base stations (eNodeB or eNB), and in 5G networks the base stations may be a generation radio technology base station (gNodeB or gNB).

In some embodiments, each individual base station within the network may be in communication with a plurality of other base stations either directly or indirectly, and either wirelessly or via a hardwired connection. In the illustrated example, the first, second, and third base stations 102, 104, 106 may be connected via an X2 interface 116, but those skilled in the art will understand that other suitable interface may be used within the scope of the disclosure. The X2 interface may traditionally be used to handover a UE from a source base station to a target (or receiving) base station as the UE travels from one cell (e.g., the first cell 103) to an adjacent cell (e.g., the second cell 105), the first base station 102 may "hand off" the UE to the second base station 104 to smooth so as not to interrupt the UE's service. In some embodiments, the interface between base stations may be an S1 interface, or another suitable interface known in by those skilled in the art. At any given time, each base station in the base station cluster 100 may be in communication with one or more UEs. As UEs may be mobile devices that are movable between cells, it should be understood that the positions of the UEs in FIG. 1 may change at any time and the UEs may regularly move between cells. At the time depicted in FIG. 1, UEs 106a, 106b are disposed in the first cell 103, UEs 108a, 108b are disposed within the second cell 105, and UEs 110a, 110b are disposed within the third cell 107.

In some embodiments, each UE may periodically communicate with one or more base stations to request a spectrum assignment. For example, the UE 106a may periodically transmit a spectrum assignment request to the first base station 102 so long as the UE 106a is located with the first cell 103. The spectrum assignment request may be a request for the base station to assign a particular portion of the available radio spectrum that the requesting UE should use for any services performed over the cellular network. In some embodiments, the spectrum assignment may be expressed in terms of physical resource blocks (PRB). A PRB may be the smallest unit of network resources that may be allocated to a UE. In some embodiments, one PRB may be 180 kHz wide in frequency and one slot long in time. In one example, a particular network may have access to as spectrum bandwidth that is 20 mHz wide. Such a bandwidth may include about 100 PRB that may be allocated to UE and other devices for accessing network services. At any given time, some number of PRB may be utilized by devices in communication with a base station, and the base station may keep track of which PRB are in use. As more or fewer devices enter and leave a coverage area for a particular base station, the PRB usage may vary. For example, in FIG. 1, UE 106a and UE 106b may each be allocated distinct PRB for their use of network resources. At peak times, a larger portion of the available PRB may be allocated to connected network devices than in off-peak times, and each base station may implement layer management to allocate PRB to each UE or other connected device. The more efficiently and effectively the network's base stations may allocate PRB to connected devices, the more optimized the network may be and the better user experience network customers may have.

In some embodiments, the spectrum assignments provided by each base station to its corresponding UEs may be determined using a dynamic allocation logic that may include substantially real-time network usage data determined at substantially the same time that the spectrum assignment request may be submitted. In some embodiments, the dynamic allocation logic may include an assessment of the requesting UE's location with respect to the coverage areas of other base stations, and whether the UE appears to be moving toward (and may soon enter) an adjacent base station's coverage area. For example, in FIG. 1, UE 106b is shown as located within the first cell 103, which may be the coverage area for the first base station 102. However, UE 106b is also shown as relatively near the adjacent second cell 105, which may be the coverage are for the second base station 104. Accordingly, the illustration in FIG. 1 shows UE 106b as within a boundary zone 112 that is within the first cell 103 but that is near the adjacent second cell 105. Similarly, UE 108b is in a boundary zone 114 that may be within the second cell 105 but that may be within some predetermined distance of the adjacent third cell 107, which may be the coverage area of the third base station 106. In some embodiments, when determining the spectrum assignment for a UE, the base station with which the UE may be communicating may take into account that the location of the UE may be within a boundary zone that may be adjacent a nearby cell. For example, when the UE 106b sends a spectrum assignment request to the first base station 102, the first base station may, among other things, determine that the UE 106b may be nearby the second cell 105, and may therefore take into account spectrum use data provided to the first base station 102 by the second base station 104. In some embodiments, the first base station may also determine that the UE 106b may be travelling toward the second cell 105 and may therefore soon be handed over to the second base station 104. In some embodiments, because the first base station 102 will have taken into account the spectrum utilization of the second base station 104 when providing a spectrum assignment to the UE 106b, the spectrum that the UE 106b may be using when it crosses over to the second cell 105 may be less likely to encounter conflict with other devices over spectrum utilization. In some embodiments, a local base station may weigh the spectrum use data from a neighboring base station less heavily if a UE may be entering the local base station's coverage area as opposed to traveling toward the neighboring coverage area on the way out.

Figure 2:
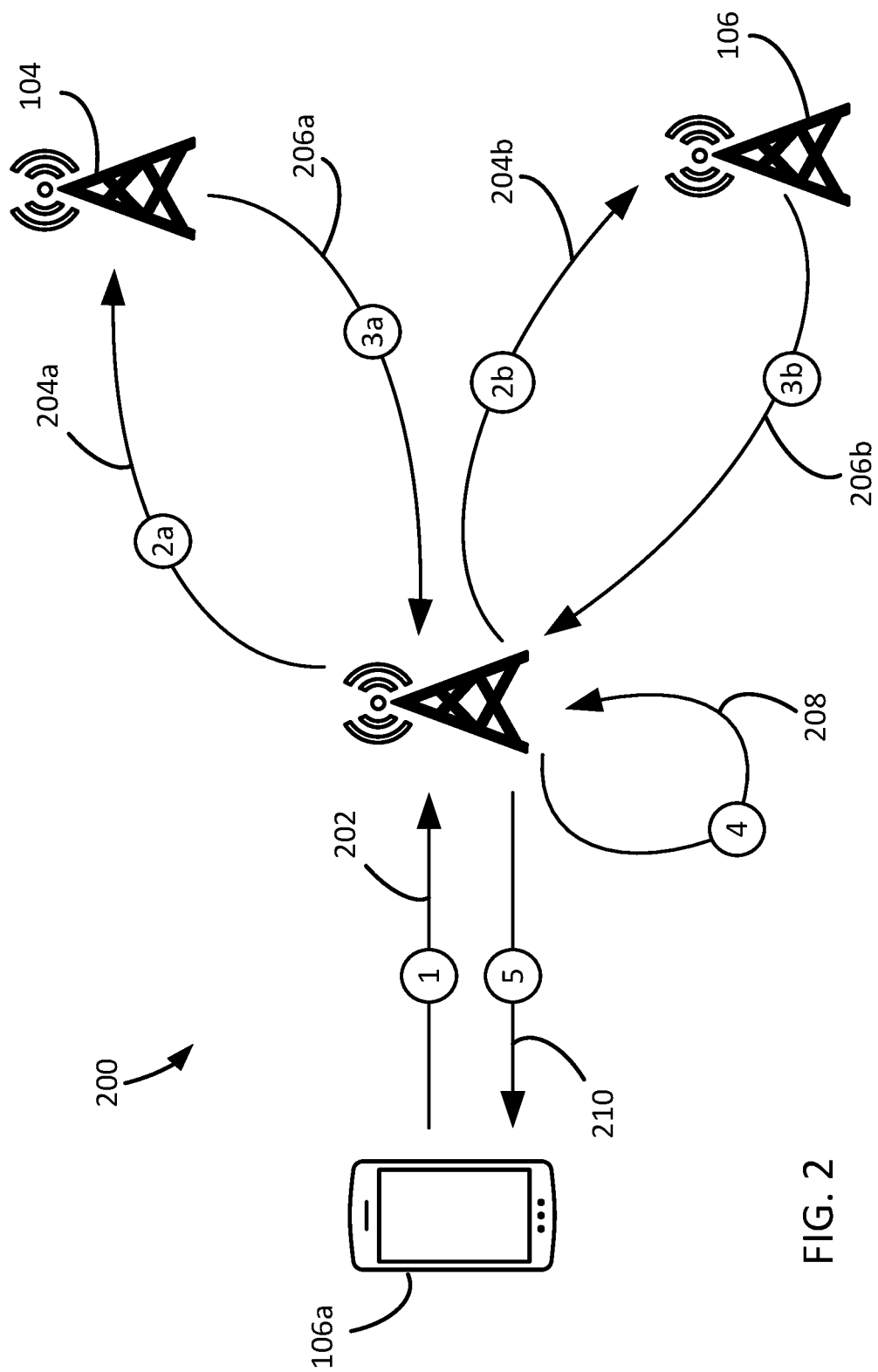
FIG. 2 is a high level diagram of an embodiment of a data flow environment for a system and methods for optimizing cellular spectrum utilization in accordance with the disclosure.

FIG. 2 is an exemplary flow diagram 200 showing an embodiment of how some components of the disclosed system may communicate with one another in accordance with the method for optimizing cellular network performance. At 202, a UE, such as UE 106a from FIG. 1, may transmit a spectrum assignment request to a local base station, such as the first base station 102. The spectrum assignment request may include device information associated with the UE 106a, such as device type, device capabilities (5G, 4G, etc.), location information, timestamp, etc. In some embodiments, the first base station 102 may, at 204a and 204b, request spectrum utilization information from one or more neighboring base stations in the base station cluster, such as the second base station 104 and the third base station 106, respectively. At 206a and 206b, the second base station 104 and the third base station 106, respectively, may respond by transmitting spectrum utilization information. In some embodiments, as described above, the spectrum utilization information may include data related to the PRB usage in the coverage areas associated with each base station. In some embodiments, spectrum utilization information may be transmitted between base stations using a table similar to exemplary Table 1 below:

TABLE 1

| Band | Bandwidth (MHz | PRB | Timestamp |
|------|----------------|-------|-----------|
| n1   | 2100           | PRB A | Time 1    |
| n2   | 1900           | PRB B | Time 2    |
| n3   | 1800           | PRB C | Time 3    |

Those of skill in the art will understand that Table 1 is merely exemplary and that many other suitable formats for sharing data between base stations may also fall within the scope of the disclosure. In some embodiments, it is also contemplated that the first base station 102 may be periodically updating the spectrum utilization information for each neighboring base station and may refer to an updated record or spectrum utilization database instead of transmitting a request in response to receiving the spectrum assignment request. At 208, the first base station may examine additional real-time factors associated with determining a spectrum assignment for the UE 106a, such as current spectrum utilization by other devices in communication with the first base station 102, the location of the UE 106a with respect to other coverage areas, the speed and direction of travel for the UE 106a, etc. Once the first base station 102 may have determined a spectrum assignment for the UE 106a using the dynamic layer management logic, the base station 102 may, at 210, transmit the spectrum assignment to the UE 106a.

Figure 3:
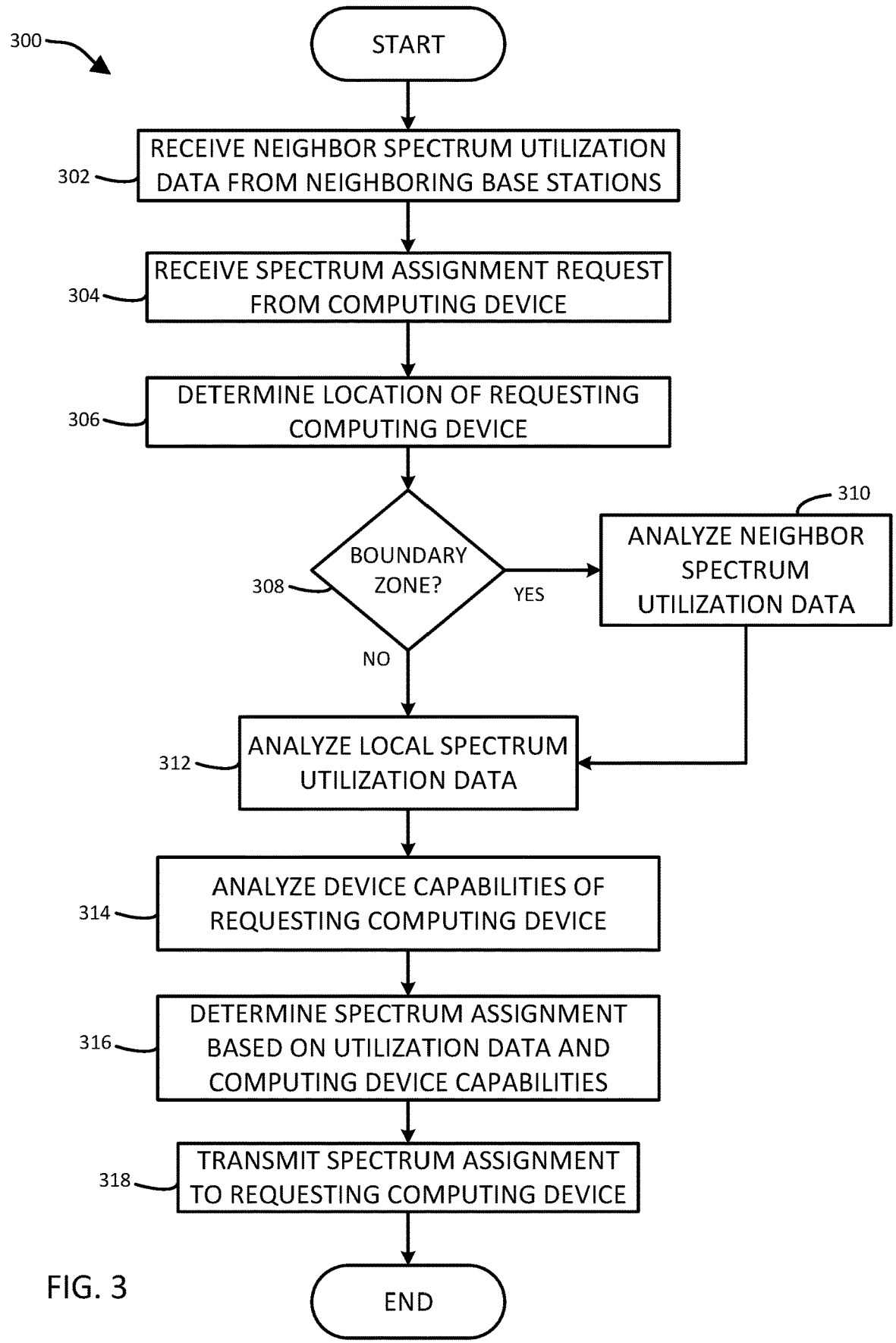
FIG. 3 is a flowchart of an embodiment of a method of optimizing cellular spectrum utilization in accordance with the disclosure.

FIG. 3 is a flow chart illustrating an embodiment of a method 300 for optimizing cellular spectrum utilization as described herein. At 302, the method may include receiving, at a local base station, neighbor spectrum utilization data from at least one neighboring base station. In some embodiments, the local base station may be part of a 5G network (i.e., gNodeB), a 4G network (eNodeB), etc. In some embodiments, a local base station may have any reasonable number of neighboring base stations, such as between about 2 and 20 neighboring base stations that may make up a base station cluster, but perhaps more or fewer based on the base station location. In some embodiments, neighboring base stations may be directly adjacent to a local base station, or may not share a coverage area border directly. Those skilled in the art will understand that each base station may have its own set of unique neighboring base stations that differs from a set of neighbor base stations for any respective neighbor base station. In some embodiments, the neighbor spectrum utilization data may include substantially real-time information regarding the spectrum bands being utilized by UEs communicating with that neighboring base station. In some embodiments, the information may include PRB data regarding the precise PRB's being utilized by the neighboring base stations and/or the PRB's that may have additional capacity. The neighbor spectrum utilization data may be transmitted between base stations via an X2 interface, and may be in the form of a spectrum usage table such as that shown in Table 1, above.

At 304, the method may include receiving, at the local base station, a spectrum assignment request from a user computing device. The user computing device may be any device having wireless access to a network supported by the base station, such as a mobile telephone, a tablet, a mobile hotspot, other smart device, etc. In some embodiments, the computing device (i.e., UE) may be located within a local coverage area of the local base station, but may also be located in coverage areas of other neighboring base stations. The spectrum assignment request may include a request for the local base station to assign the requesting UE with a spectrum band that the requesting UE may use for connection to the network. In some embodiments, UEs may transmit spectrum assignment requests passively and/or on a periodic basis and camp on those frequency between requests. In some embodiments, UEs may alternatively camp on frequency bands until a network action is requested by a user or by an automated process of the UE, at which point the UE may transmit a spectrum assignment request with which to conduct that network action. In some embodiments, the UE may determine which base station may be appropriate by identifying the nearest signal from a base station broadcasting on the desired network bandwidth (e.g., 5G, 4G, etc.).

At 306, in some embodiments, the method may include determining the location of the requesting computing device. This determination may be made based on location information shared with the base station that may be included within the spectrum assignment request, such as via GPS coordinates, etc. In some embodiments, the location of the requesting UE may be determined based on signal strength or some other suitable means. In some embodiments, at 308, the base station may determine whether the requesting UE may be within a "boundary zone" adjacent a neighboring coverage area. In some embodiments, a boundary zone may be within the local base station's coverage area but within a predetermined distance of the coverage area of a neighbor base station. In some embodiments, at 310, if the base station determines that the requesting UE may be within a boundary zone with another coverage area, the local base station may analyze the neighbor spectrum data received from the neighbor base station for which the requesting UE may be adjacent. For example, if the requesting UE may be within a boundary zone adjacent a first neighbor coverage area of a first neighbor base station, the local base station may, in response to the request, analyze the neighbor spectrum data for the first neighbor base station. In some embodiments, the local base station may request updated neighbor spectrum utilization data from the first neighbor base station in response to receiving the spectrum assignment request, or may refer to neighbor spectrum utilization data previously received and stored.

At 312, in some embodiments, the method may include analyzing local spectrum utilization data that may be based on spectrum utilization of UEs communicating with the network via the local base station. In some embodiments, if the requesting device may not be within a boundary zone, the method may not take neighboring spectrum utilization data into account but instead analyze only local spectrum utilization data. In some embodiments, when the requesting UE may be within a boundary zone, the method may include analyzing spectrum utilization data both locally and from a neighbor base station. Analyzing local spectrum utilization data may include analyzing the substantially real-time load on the frequency bands available to the local base station to determine which portion or portions of the spectrum may be best to assign to the requesting UE. In some embodiments, the analysis may include determining which PRBs may be being used by other UEs within the coverage area of the local base station and which PRBs may be available. In some embodiments, the local base station may analyze the local spectrum utilization periodically and use the latest spectrum utilization information available upon receiving the request, while in other embodiments, the local base station may check the local real-time spectrum utilization in response to receiving a spectrum assignment request.

In some embodiments, the local base station may implement machine learning or other artificial intelligence techniques in analyzing the substantially real-time spectrum utilization data and other factors to optimize spectrum assignments. For example, in some embodiments, the local base station may periodically or continuously analyze historic data related to frequency allocation, call success, dropped call rates, and other key performance indicators (KPI) to determine factors that may maximize network efficiency and minimize quality of service (QoS) problems encountered by network customers. This historic data may provide an additional dynamic input to the local base station's analysis to determine the optimal frequency for assignment to the requesting UE. In some embodiments, the local base station may use machine learning techniques to predict how likely a UE may be to travel from the local base station's coverage area to a neighboring coverage area based on factors such as time, previous history of the requesting UE, peak traffic times, etc. For example, in some embodiments, the local base station may determine that, at certain times of day (e.g., rush hour) or on certain days (e.g., weekdays), that UEs are more likely to move between coverage areas. Insights such as these may cause the local base station to more heavily weight the spectrum utilization data provided by one or more neighbor base stations because the UE may be more likely to move during that time. In some embodiments, the local base station may additionally use machine learning techniques to analyze At 314, in some embodiments, the method may include analyzing device capabilities of the requesting computing device. In some embodiments, device capability information may be included in the spectrum assignment request received from the requesting UE. In some embodiments, the local base station may include a database or other catalog of information that may include information on the capabilities of a variety of different types of UEs. Some examples of device capability may be which type of network they may connect with an utilize, such as 3G, 4G, 5G, etc.

At 316, the method may include determining a spectrum assignment for the requesting UE based at least partially on the local spectrum utilization, the neighbor spectrum utilization data, and/or the device capabilities of the requesting UE. In some embodiments, fewer than all of these criteria may be used in the analysis, and those of skill in the art will understand that other criteria may also be included in the analysis. In some embodiments, the local base station may include logic that may determine spectrum assignments based on additional dynamic factors including time (e.g., peak time versus off-peak time), location within/out of a coverage area, signal strength, etc. In some embodiments, the local base station may determine whether a requesting UE may be moving toward or away from a neighboring coverage area so as to more heavily weight spectrum utilization data from that neighboring coverage area's base station. In some embodiments, the local base station may determine that, even though a UE may be within a boundary zone, that the UE may be traveling away from the adjacent neighboring coverage area and therefore give less weighting to neighbor spectrum utilization data. In some embodiments, the logic for determining a spectrum assignment may be dynamic such that a first UE and a second UE that may request a spectrum assignment from the same local base station may be assigned a spectrum band using at least partially different data and factors due to differences in the timing, location, and/or capabilities of the first and second requesting UEs. In some embodiments, the analysis may include selecting a frequency assignment based on avoiding frequencies used within the local coverage area and the coverage area of one or more neighboring base stations so as to help limit interference between UEs in nearby coverage areas. In some embodiments, the analysis may include consideration of the requesting UE's distance from the local base station, as certain available spectrum frequencies may be more effective at shorter or longer distances from the base station. For example, more high frequency spectrum may be more likely to be allocated to UEs nearer the local base station due to physical limits of wave propagation, while UEs further from the base station may be more likely to be allocated lower frequencies. In some embodiments, the local base station may also weigh the type of use the UE may conduct using the network, and may more heavily weigh higher frequencies for data-heavy activities such as video streaming, and may more heavily weigh lower frequencies for less data-heavy activities.

At 318, the method may include transmitting a spectrum assignment to the requesting computing device. In some embodiments, the spectrum assignment may be transmitted over a control channel or another frequency that may be dedicated to communications between the base station and UEs. In some embodiments, each UE may perform the process of requesting and receiving a spectrum assignment periodically, such as once every minute, or once every second, or more or less frequently.

In some embodiments, the method 300 may provide a technical solution to the technical problem of optimizing utilization of the frequency spectrum available to a network operator. Using substantially real-time spectrum utilization information from the local base station may provide for less likelihood of interference between UEs using the same or similar frequencies to connect to the network. Additionally, taking into account spectrum usage information for neighboring base stations may also optimize reliability of the network for customers because it may reduce chances of interference with UEs in adjacent or other neighboring coverage areas, and may reduce complications when UEs travel from the coverage area of one base station to another. In some embodiments, the spectrum optimization methods may be particularly effective in networks or with network operators having relatively small ranges of bandwidth available for assignment. For example, operating some 5G networks may benefit from more optimization of spectrum assignments due to limited range of certain frequencies, etc. This should not be understood, however, to mean that the methods may not be beneficial to other types of networks as well.

Figure 4:
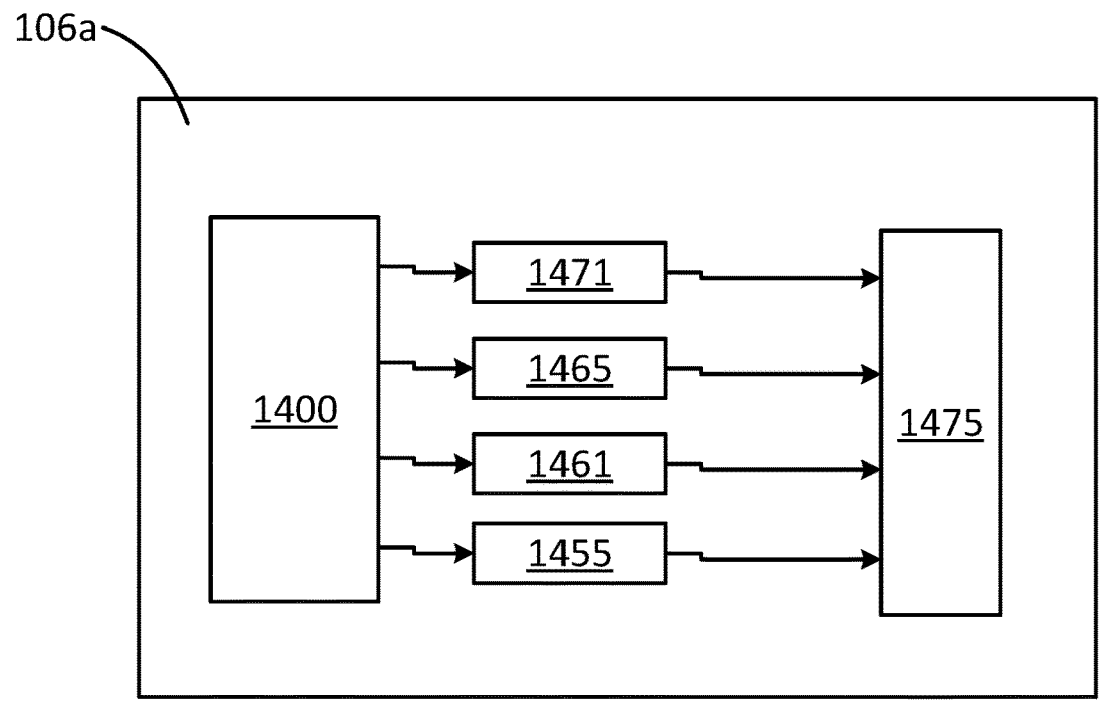
FIG. 4 is a schematic illustration of elements of an embodiment of an example computing device.
Figure 5:
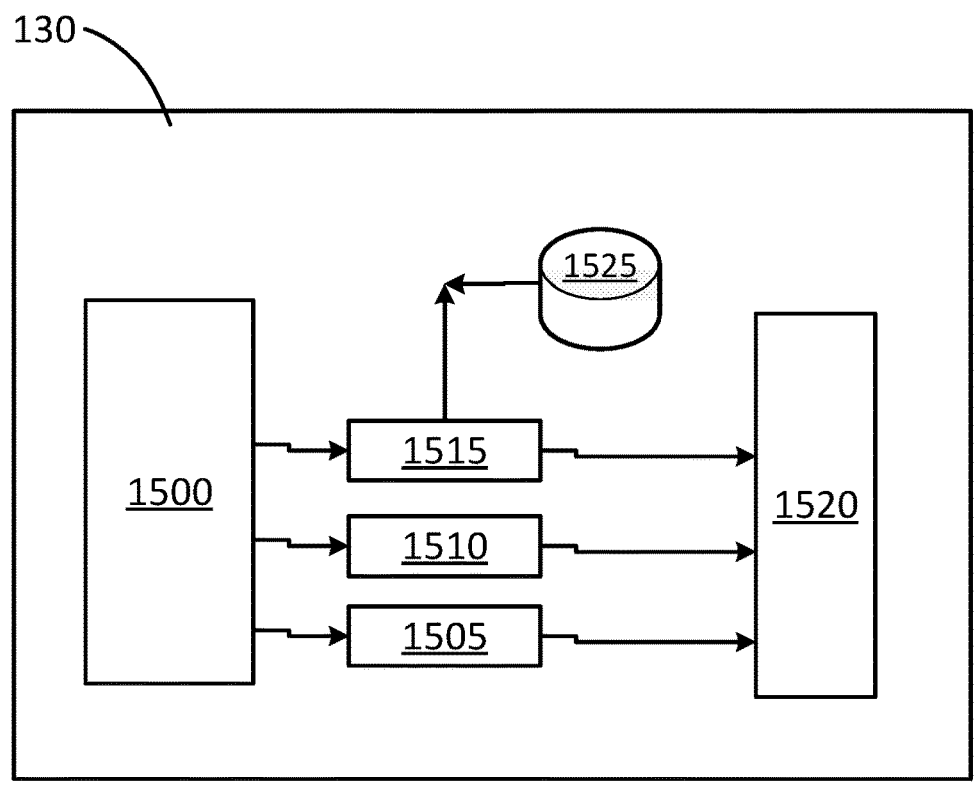
FIG. 5 is a schematic illustration of elements of an embodiment of a server type computing device.

FIG. 4 is a simplified illustration of some physical elements that may make up an embodiment of a computing device, such as the UE 106*a*, and FIG. 5 is a simplified illustration of the physical elements that make up an embodiment of a server type computing device, such as may be used along with a base station, such as base station 102. Referring to FIG. 4, a sample computing device is illustrated that is physically configured to be part of the systems and method for reducing network disruptions. The computing device 106*a* may have a processor 1451 that is physically configured according to computer executable instructions. In some embodiments, the processor may be specially designed or configured to optimize communication between a server relating to the system described herein. The computing device 106*a* may have a portable power supply 1455 such as a battery, which may be rechargeable. It may also have a sound and video module 1461 which assists in displaying video and sound and may turn off when not in use to conserve power and battery life. The computing device 106*a* may also have volatile memory 1465 and non-volatile memory 1471. The computing device 106*a* may have GPS capabilities that may be a separate circuit or may be part of the processor 1451. There also may be an input/output bus 1475 that shuttles data to and from the various user input/output devices such as a microphone, a camera, a display, or other input/output devices. The computing device 106*a* also may control communicating with networks either through wireless or wired devices. Of course, this is just one embodiment of a computing device 106*a* and the number and types of computing devices 106*a* is limited only by the imagination.

The physical elements that make up an embodiment of a server, such as a base station server 130 associated with base station 102, are further illustrated in FIG. 5. In some embodiments, the server may be specially configured to run the system and methods for optimizing spectrum utilization as disclosed herein. At a high level, the server may include a digital storage such as a magnetic disk, an optical disk, flash storage, non-volatile storage, etc. Structured data may be stored in the digital storage a database. More specifically, the server 130 may have a processor 1500 that is physically configured according to computer executable instructions. In some embodiments, the processor 1500 can be specially designed or configured to optimize communication between a computing device, such as computing device 106*a*, or between other base stations and network nodes relating to the system as described herein. The server may also have a sound and video module 1505 which assists in displaying video and sound and may turn off when not in use to conserve power and battery life. The server 130 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a user data controller for running a user data API may be located on the computing device 106*a*. However, in other embodiments, the user data controller may be located on server 130, or both the computing device 106*a* and the server 130. Of course, this is just one embodiment of the server 130 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for managing radio spectrum in a cellular network, the method comprising:
   receiving, at a local base station, first neighbor spectrum utilization data from a neighbor base station in the cellular network, the first neighbor spectrum utilization data associated with spectrum use levels at the neighbor base station at a first point in time;
   receiving, at the local base station, a first spectrum assignment request from a first mobile computing device;
   in response to receiving the first spectrum assignment request and determining that the first mobile computing device is in a boundary zone of the local base station, determining, via one or more processors at the local base station, a first spectrum assignment for the first mobile computing device based on the first neighbor spectrum utilization data, wherein less weighting is given to the first neighbor spectrum utilization data when the local base station determines that the first mobile computing device is moving away from the neighbor base station;
   transmitting the first spectrum assignment to the first mobile computing device;
   receiving, at the local base station, second neighbor spectrum utilization data from the neighbor base station, the second neighbor spectrum utilization data associated with spectrum use levels at the neighbor base station at a second point in time different than the first point in time;
   receiving, at the local base station, a second spectrum assignment request;
   in response to receiving the second spectrum assignment request, determining, via the one or more processors at the local base station, a second spectrum assignment based on the second neighbor spectrum utilization data; and
   transmitting the second spectrum assignment.

2. The method of claim 1, wherein the second spectrum assignment request is received from a second mobile computing device and wherein the second spectrum assignment is transmitted to the second mobile computing device.

3. The method of claim 1, wherein the second spectrum assignment request is received from the first mobile computing device and wherein the second spectrum assignment is transmitted to the first mobile computing device.

4. The method of claim 1, wherein a local coverage area associated with the local base station is adjacent to a neighbor coverage area associated with the neighbor base station.

5. The method of claim 1, wherein the local base station receives the first and second neighbor spectrum utilization data from the neighbor base station via an X2 interface.

6. The method of claim 1, wherein the first and second spectrum assignments each include at least one frequency.

7. The method of claim 1, wherein the first and second neighbor spectrum utilization data includes physical resource block (PRB) usage information, and wherein the first and second spectrum assignments are each determined so as to optimize PRB allocation.

8. The method of claim 1 further comprising periodically analyzing, by the one or more processors at the local base station in the cellular network, local spectrum utilization data to determine spectrum use levels at the local base station, and wherein the first and second spectrum assignments are additionally based on the local spectrum utilization data.

9. A computing device comprising:
one or more processors; and
non-transitory computer-readable media storing computer-executable instructions that, when executed by the one or more processors, cause the one or more processors to perform actions comprising:
receiving, at a local base station, first neighbor spectrum utilization data from a neighbor base station in a cellular network, the first neighbor spectrum utilization data associated with spectrum use levels at the neighbor base station at a first point in time;
receiving, at the local base station, a first spectrum assignment request from a first mobile computing device;
in response to receiving the first spectrum assignment request and determining that the first mobile computing device is in a boundary zone of the local base station, determining, via one or more processors at the local base station, a first spectrum assignment for the first mobile computing device based on the first neighbor spectrum utilization data, wherein less weighting is given to the first neighbor spectrum utilization data when the local base station determines that the first mobile computing device is moving away from the neighbor base station;
transmitting the first spectrum assignment to the first mobile computing device;
receiving, at the local base station, second neighbor spectrum utilization data from the neighbor base station, the second neighbor spectrum utilization data associated with spectrum use levels at the neighbor base station at a second point in time different than the first point in time;
receiving, at the local base station, a second spectrum assignment request;
in response to receiving the second spectrum assignment request, determining, via the one or more processors at the local base station, a second spectrum assignment based on the second neighbor spectrum utilization data; and
transmitting the second spectrum assignment.

10. The computing device of claim 9, wherein the second spectrum assignment request is received from a second mobile computing device and wherein the second spectrum assignment is transmitted to the second mobile computing device.

11. The computing device of claim 9, wherein the second spectrum assignment request is received from the first mobile computing device and wherein the second spectrum assignment is transmitted to the first mobile computing device.

12. The computing device of claim 9, wherein a local coverage area associated with the local base station is adjacent to a neighbor coverage area associated with the neighbor base station.

13. The computing device of claim 9, wherein the local base station receives the first and second neighbor spectrum utilization data from the neighbor base station via an X2 interface.

14. The computing device of claim 9, wherein the first and second spectrum assignments each include at least one frequency.

15. The computing device of claim 9, wherein the first and second neighbor spectrum utilization data includes physical resource block (PRB) usage information, and wherein the first and second spectrum assignments are each determined so as to optimize PRB allocation.

16. The computing device of claim 9 further comprising periodically analyzing, by the one or more processors at the local base station in the cellular network, local spectrum utilization data to determine spectrum use levels at the local base station, and wherein the first and second spectrum assignments are additionally based on the local spectrum utilization data.

17. A system including a computing device comprising:
one or more processors; and
non-transitory computer-readable media storing computer-executable instructions that, when executed by the one or more processors, cause the one or more processors to perform actions comprising:
receiving, at a local base station, first neighbor spectrum utilization data from a neighbor base station in a cellular network, the first neighbor spectrum utilization data associated with spectrum use levels at the neighbor base station at a first point in time;
receiving, at the local base station, a first spectrum assignment request from a first mobile computing device;
in response to receiving the first spectrum assignment request and determining that the first mobile computing device is in a boundary zone of the local base station, determining, via one or more processors at the local base station, a first spectrum assignment for the first mobile computing device based on the first neighbor spectrum utilization data, wherein less weighting is given to the first neighbor spectrum utilization data when the local base station determines that the first mobile computing device is moving away from the neighbor base station;
transmitting the first spectrum assignment to the first mobile computing device;
receiving, at the local base station, second neighbor spectrum utilization data from the neighbor base station, the second neighbor spectrum utilization data associated with spectrum use levels at the neighbor base station at a second point in time different than the first point in time;
receiving, at the local base station, a second spectrum assignment request;
in response to receiving the second spectrum assignment request, determining, via the one or more processors at the local base station, a second spectrum assignment based on the second neighbor spectrum utilization data; and
transmitting the second spectrum assignment.

18. The system of claim 17, wherein the second spectrum assignment request is received from a second mobile computing device and wherein the second spectrum assignment is transmitted to the second mobile computing device.

19. The system of claim 17, wherein the second spectrum assignment request is received from the first mobile computing device and wherein the second spectrum assignment is transmitted to the first mobile computing device.

20. The system of claim 17, wherein a local coverage area associated with the local base station is adjacent to a neighbor coverage area associated with the neighbor base station.

* * * * *